May 9, 1950     C. M. SKINNER, JR     2,507,227
DAMPING MEANS
Filed July 2, 1945

WITNESSES:
N. F. Susser.
E. F. Oberhein

INVENTOR
Claude M. Skinner, Jr.
BY
Paul E. Friedemann
ATTORNEY

Patented May 9, 1950

2,507,227

UNITED STATES PATENT OFFICE 2,507,227

DAMPING MEANS

Claude M. Skinner, Jr., Catonsville, Md., assignor to Westinghouse Electric Corporation, East Pittsburgh, Pa., a corporation of Pennsylvania Application July 2, 1945, Serial No. 602,871

1 Claim. (Cl. 248—358)

This invention relates, generally, to vibration isolators and, more particularly, to vibration isolators which are mechanically damped.

There are numerous applications in which equipment, incapable of satisfactory or reliable operation under conditions of vibration, must be mounted because of design considerations to a vibrating support or base. In such applications, it is essential that a minimum of vibration is transmitted from the support and the usual practice is to provide a vibration isolator mounting for the equipment on the support. Many varieties of isolators are available for this purpose, but for the most part, special consideration must be made to assure the application of vibration isolators having a natural frequency below the minimum frequencies of the support. In many instances, this approach to the problem is not practical since the support, in some applications, may cover such a wide frequency range in its vibration, the low frequency end of which is so low that the stiffness of the isolator at that frequency is insufficient for the load it must carry. Any increase in size of the vibration isolators to obtain the necessary stiffness at the low frequency is usually limited by available space. The amplitude of the support vibration from zero to the natural frequency of the isolator, is increasingly amplified by the isolator as the natural frequency of the isolator is approached. When damping is not intentionally introduced, the amplification is limited only by the hysteresis of the resilient material of the isolator. Unless extremely large relative movement of the isolator parts is provided, impact of the parts occurs causing excessive accelerations which may result in damage to the equipment which the isolators are to protect. Thus, mechanical damping of vibration isolators to reduce the total excursion of the relatively movable elements becomes essential.

A principal object of this invention is to provide a mechanically damped vibration isolator which is extremely simple in construction and effective in operation.

Another object of this invention is to provide a device of the class described in which damping is provided in a high energy loss in the isolator through the medium of fluid pumping action.

Figure 1:
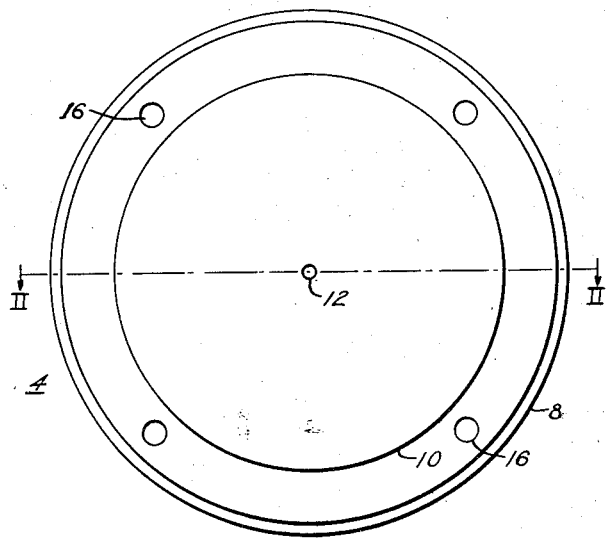
Figure 2:
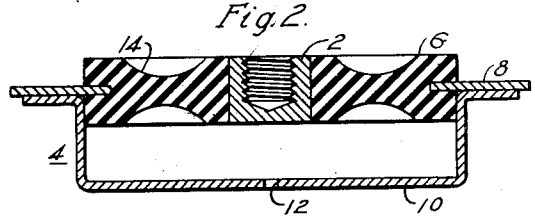

Other objects and advantages will become apparent from a study of the following specification when considered in conjunction with the accompanying drawing, in which:

Figure 1 is a bottom plan view of a vibration isolator embodying the principles of this invention; and Fig. 2 is a sectional view, taken on the line II—II of Fig. 1.

The vibration isolator illustrated in the drawing includes a pair of relatively displaceable members 2 and 4 which are resiliently joined by the rubber diaphragm 6. The member 2 is secured centrally of the rubber diaphragm while the member 4 has the washer-like element 8 thereof embedded in a peripheral groove in the rubber diaphragm. These elements may be assembled as inserts in the mold in which the diaphragm is formed and thus securely bonded to the diaphragm, or otherwise securely joined thereto after molding of the diaphragm substantially to the configuration shown. The cup 10 having the orifice 12 therein is flanged outwardly at its open end and the flange surface is securely joined to the washer-like element 8 to provide an air-tight seal. Circular recesses 14 are provided in the transverse faces of the diaphragm to provide greater diaphragm flexibility at the point of recessing. This expedient assures greater stability of the mounting faces of the diaphragm and this minimizes the tendency of these faces to break away from the members to which they are joined. Holes 16 for mounting the member 4 are drilled through the washer-like element 8 and the cup flange, while the member 2 centrally located of the diaphragm 6, is drilled and tapped to receive a threaded stud or bolt.

The vibration isolator thus described acts as a diaphragm pump upon relative movement of the members 2 and 4 and air is pumped back and forth through the orifice 12 in the cup 10 as the volume of the cup chamber varies. Thus, the more the relative movement of the members 2 and 4 under the influence of vibration the greater is the amount of energy dissipated as work done pumping air. The characteristics of the isolator are measurably improved over the entire frequency range and particularly over the low frequency range of vibrations from zero to the natural frequency of the assembly, since the high energy loss in air pumping measurably reduces the low frequency swing of the relatively movable members and thus obviates the possibility of contact of the member 2 with the cup 10 when the vibration isolator is properly applied.

It is immaterial, from an operating point of view, which of the members 2 or 4 are secured to the aparatus or equipment to be vibration isolated. In any case, it is essential that the orifice communicate with the atmosphere, that air pumped from the cup chamber therethrough may be rapidly dissipated in the atmosphere and not stored under pressure to be released on the other half cycle of the vibratory movement.

While the diaphragm is illustrated as made from rubber, it will be apparent that any suitable resilient member may be substituted, for example, a suitably formed flexible metal diaphragm may be utilized.

The foregoing disclosure and the showings made in the drawing are merely illustrative of the principles of this invention and are not to be considered in a limiting sense. The only limitations are to be determined from the scope of the appended claim.

I claim as my invention:

A vibration isolator assembly comprising, in combination, a cup-shaped member having an orifice therein and having an outwardly directed flange at the open end thereof, a flexible diaphragm of non-metallic resilient material having a configuration corresponding to that of said cup-shaped member to fit within said cup-shaped member, said flexible diaphragm having an opening therethrough substantially centrally thereof, a metallic mounting insert secured and sealed in said opening, said flexible diaphragm being sufficiently thick to afford stiffness of said diaphragm which is adequate to support a member connected to said mounting insert, said diaphragm having a peripheral groove therein, a washer secured in said groove and having a protruding margin secured to the upper face of said flange with said diaphragm disposed in said cup-shaped member, said diaphragm having a continuous recess in each face thereof about said mounting insert to reduce the thickness of said diaphragm in a region intermediate the margin of said opening and the margin of said peripheral groove for the purpose of largely confining diaphragm deflection to said region and minimizing deflection of the surfaces of said diaphragm engaging said mounting insert and said washer, said orifice being sufficiently small to limit air flow into said cup-shaped member from the atmosphere and out of said cup-shaped member from the atmosphere and out of said cup-shaped member into the atmosphere so that movement of said flexible diaphragm is damped.

CLAUDE M. SKINNER, JR.

REFERENCES CITED

The following references are of record in the file of this patent:

UNITED STATES PATENTS

| Number | Name | Date |
|---|---|---|
| 1,166,811 | Bowers | Jan. 4, 1916 |
| 1,975,145 | Geyer | Oct. 2, 1934 |
| 2,086,501 | Hill et al. | July 9, 1937 |
| 2,351,427 | Henshaw | June 13, 1944 |
| 2,361,575 | Thompson | Oct. 31, 1944 |